(12) United States Patent
Chen (10) Patent No.: US 7,784,890 B1
(45) Date of Patent: Aug. 31, 2010

(54) BIAXIAL FLOW DAMPER FOR DRAWER

(75) Inventor: Yung-Liang Chen, Taipei Hsien (TW)

(73) Assignee: GSlide Corporation, Taipei Hsien (TW)

( * ) Notice: Subject to any disclaimer, the term of this patent is extended or adjusted under 35 U.S.C. 154(b) by 586 days.

(21) Appl. No.: 11/905,633

(22) Filed: Oct. 3, 2007

(51) Int. Cl.
*A47B 95/02* (2006.01)

(52) U.S. Cl. .............................. 312/319.1; 312/334.44

(58) Field of Classification Search ............. 312/319.1, 312/333, 334.44, 334.46; 16/54, 286, 85; 188/302–304
See application file for complete search history.

(56) References Cited

U.S. PATENT DOCUMENTS 6,493,904 B1 * 12/2002 Chiang .......................... 16/56
6,837,343 B1 * 1/2005 Bugaj .......................... 188/304
7,559,396 B2 * 7/2009 Schwindt .................... 180/227

* cited by examiner

*Primary Examiner*—Darnell M Jayne
*Assistant Examiner*—Matthew W Ing
(74) *Attorney, Agent, or Firm*—Cook Alex Ltd.

(57) ABSTRACT

A biaxial flow damper used in an auto-close mechanism of a sliding rail assembly is disclosed to include a cylinder body defining flow parallel flow chambers, two first end caps respectively mounted in the front and rear sides of the cylinder body to close one end of each of the flow chambers, two second end caps respectively mounted in the front and rear sides of the cylinder body to close the opposite end of each of the flow chambers, two pistons respectively slidably mounted in the flow chambers of the cylinder body, and two piston rods respectively connected to the pistons and respectively extending out of the first end caps at the front and rear sides of the cylinder body.

28 Claims, 11 Drawing Sheets

BIAXIAL FLOW DAMPER FOR DRAWER

BACKGROUND AND SUMMARY OF THE INVENTION

The present invention relates to a damping device for use in an auto-close mechanism of a sliding rail assembly for drawer or the like and more particularly, to a biaxial flow damper for drawer, which uses front and rear pistons in two parallel flow chambers in one cylinder body to provide a relatively greater resistance, enhancing the buffer effect against the movement of the auto-close mechanism, and therefore the auto-close mechanism does not require much installation space while providing a relatively longer buffer stroke.

U.S. Pat. No. 6,615,450B2, U.S. Pat. No. 7,244,005 & Taiwan Utility Model No. M294879 disclose a monoaxial apparatus for the damping of impacts, preferably the impacts of furniture doors or drawers. According to this design, a compression spring is used to impart a damping resistance to the furniture drawer as the piston rod is moved to the inside of the cylinder. When the piston rod is extending out of the cylinder, the tube-section-like part of the compression spring is compressed to absorb shocks, lowering the noise level. However, this design is not suitable for the condition where a great buffer effect is required. Extending the stroke of the buffer effect to enhance the damping for application in a condition where a great buffer effect is required will complicates the structure and relatively increase the dimension. Therefore, this prior art design has its limitation on application.

The present invention has been accomplished under the circumstances in view. It is one object of the present invention to provide a biaxial flow damper for drawer, which uses front and rear pistons in two parallel flow chambers in one cylinder body to provide a relatively greater resistance, enhancing the buffer effect against the movement of the auto-close mechanism, and therefore the auto-close mechanism does not require much installation space while providing a relatively longer buffer stroke.

It is another object of the present invention to provide a biaxial flow damper for drawer, which requires less installation space and provides a long buffer stroke to enhance the buffer effect and, which is practical for use in the sliding rail assembly of a drawer, server, or the like.

DETAILED DESCRIPTION OF THE INVENTION

Referring to FIGS. 1~13, a biaxial flow damper 1 is shown used in an auto-close mechanism in a sliding rail assembly for drawer. The auto-close mechanism comprises two spring members 30, a holder base 31, a sliding block set 32, and a link 33.

The holder base 31 is affixed to the rear side of the outer sliding rail 21 of the sliding rail assembly (see FIG. 6) in a cabinet or server frame (not shown), comprising a longitudinal sliding slot 311, a locating recess 312 disposed at the front side of the sliding slot 311 (see FIG. 8), an accommodation chamber 314 disposed near the rear side in communication and longitudinal alignment with the longitudinal sliding slot 311 for accommodating the biaxial flow damper 1, and two rear locating rods 313 disposed at two sides relative to the accommodation chamber near the rear side of the holder base 31.

The sliding block set 32 (see FIGS. 1 and 8) comprises a slide 321 longitudinally slidably accommodated in the sliding slot 311 of the holder base 31, and a swivel hook 322. coupled to the front side of the slide 321. The slide 321 has two locating rods 3211 disposed at its two opposite lateral sides, and a rear mounting groove 3212 connected to the biaxial flow damper 1. The swivel hook 322 has a coupling portion 3221 for detachably coupling to the link 33, and a hooked portion 3222 (see FIG. 8) for hooking in the locating recess 312 of the holder base 31.

Figure 1:
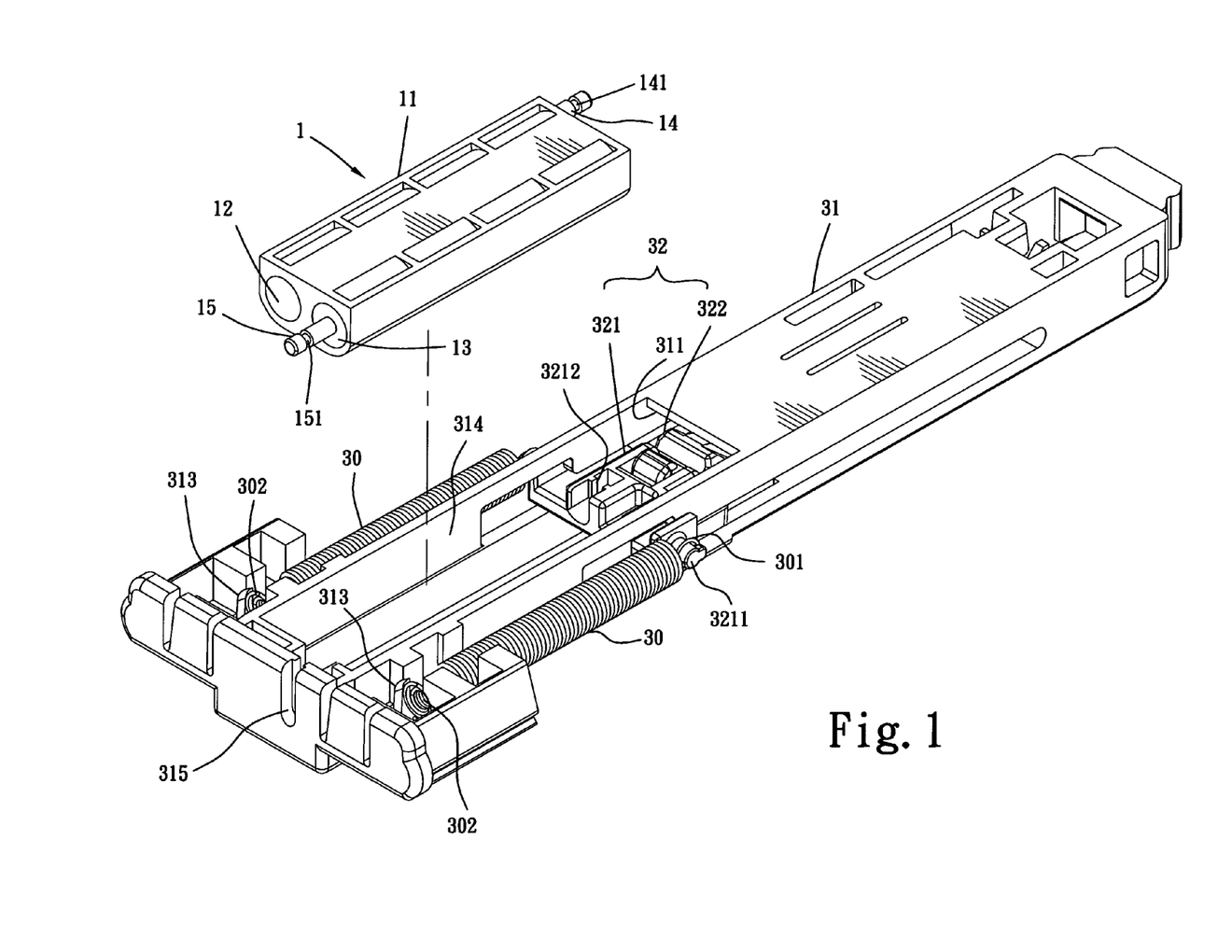
FIG. 1 is an exploded view showing the relationship between a biaxial flow damper and an auto-close mechanism according to the present invention.
Figure 2:
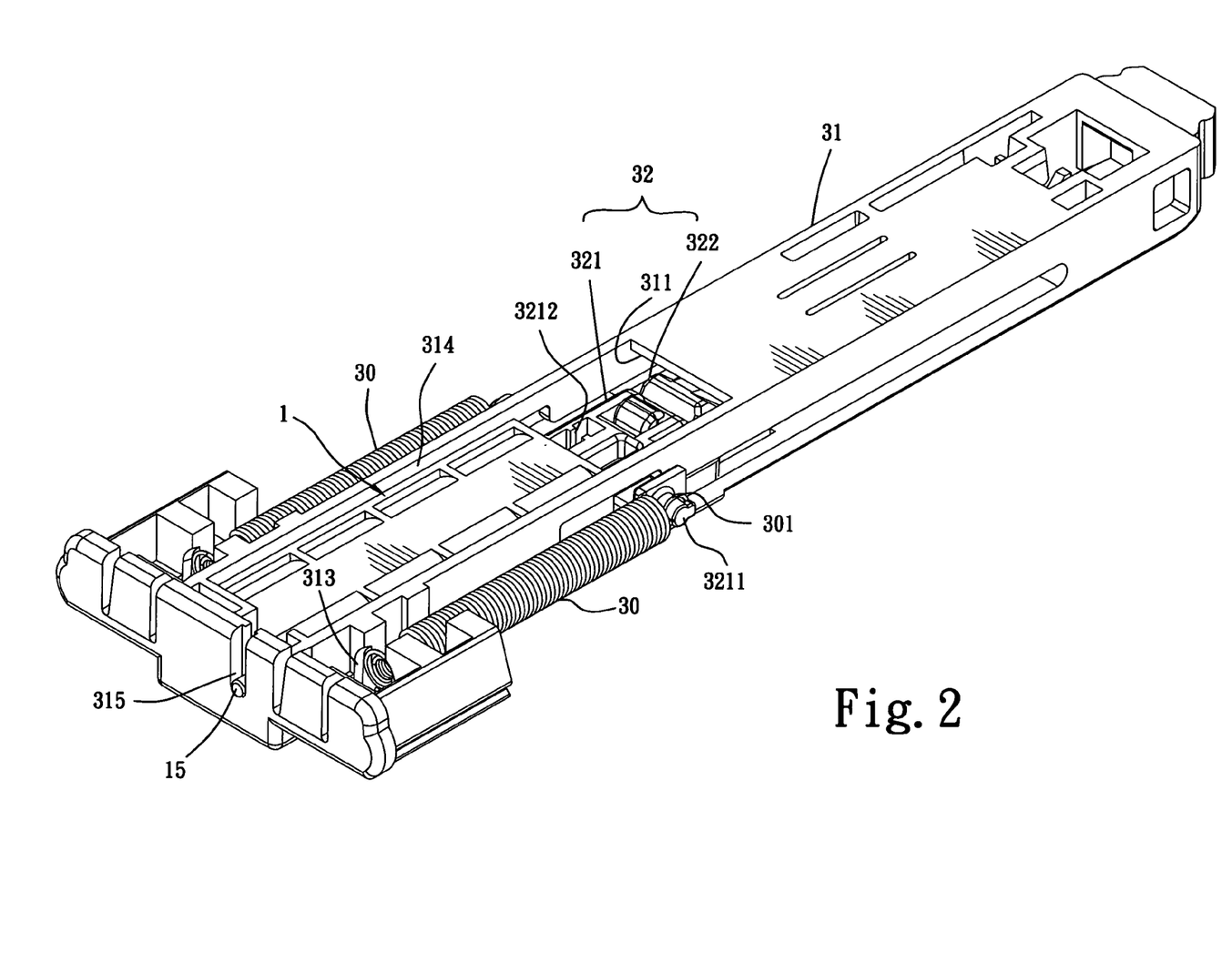
FIG. 2 is an oblique bottom elevation of the assembly of FIG. 1.
Figure 3:
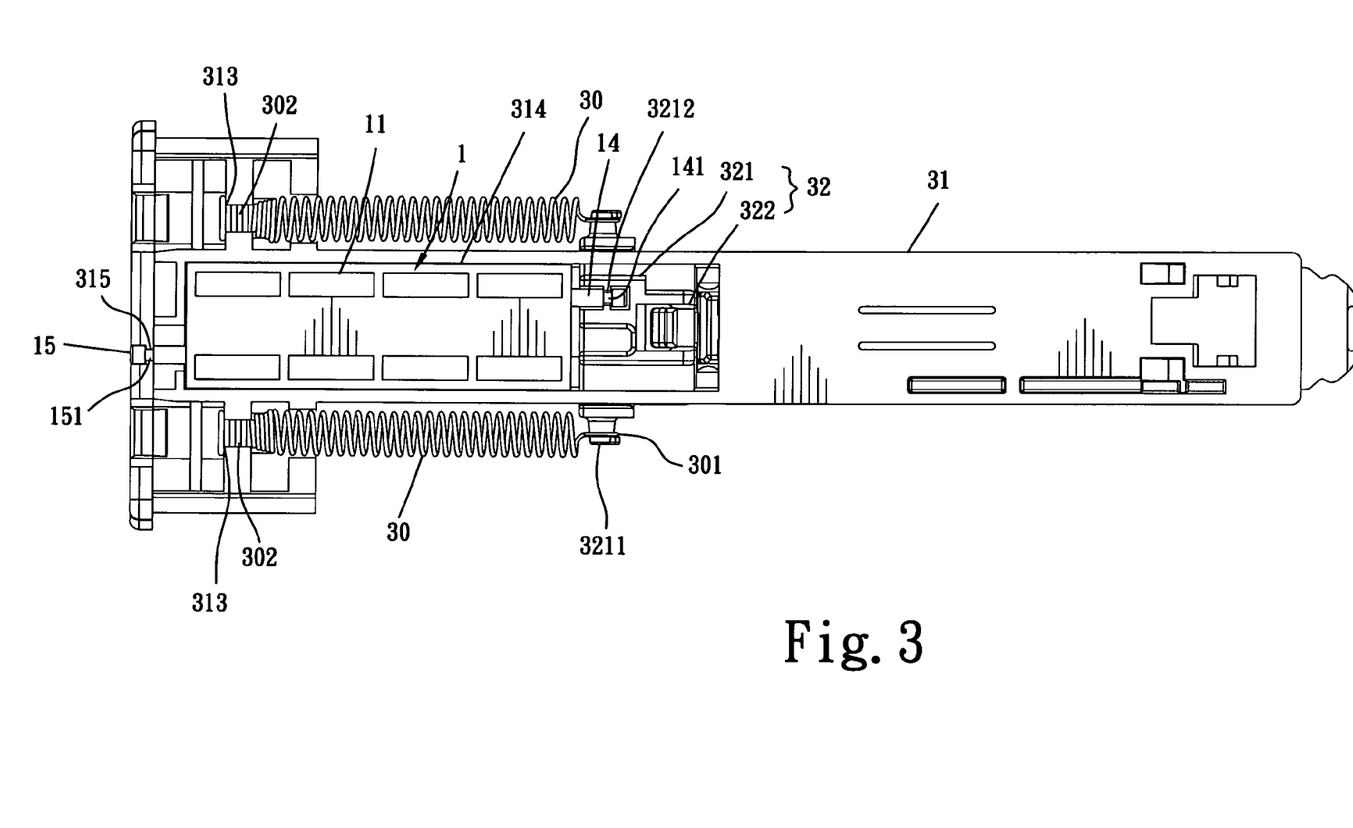
FIG. 3 is a top plain view of FIG. 2.
Figure 4:
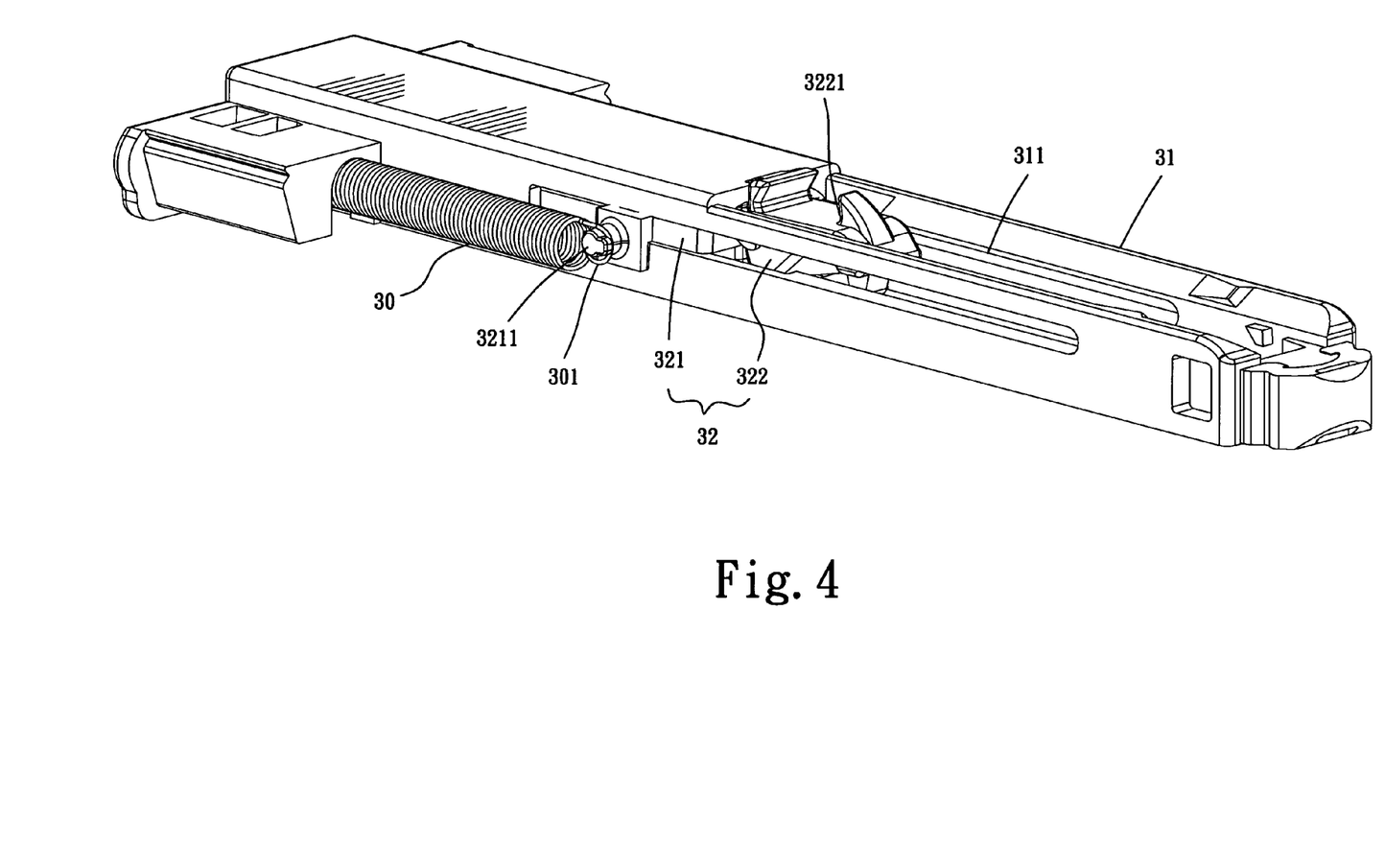
FIG. 4 is an oblique front elevation of the assembly of FIG. 1.
Figure 5:
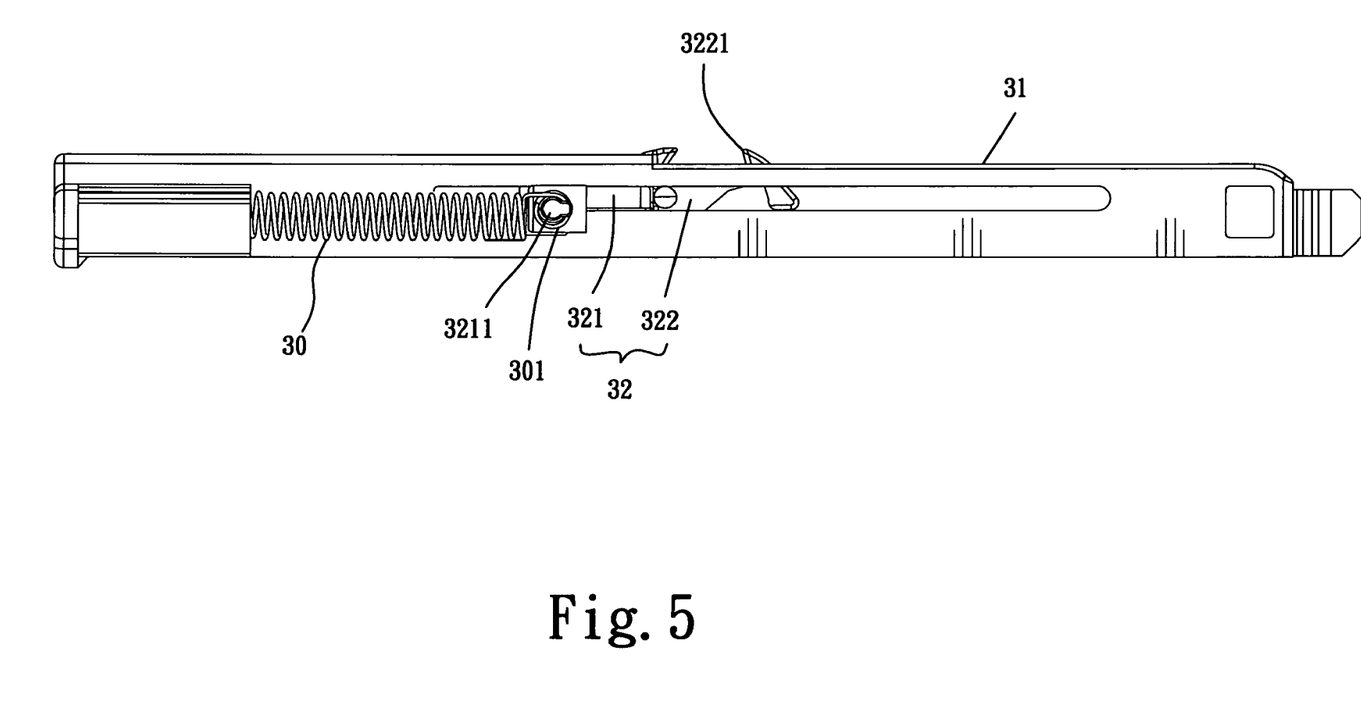
FIG. 5 is a side plain view of FIG. 4.

The spring members 30 each have a front end 301 respectively fastened to the locating rods 3211 of the slide 321 of the sliding block set 32, and a rear end 302 respectively fastened to the locating rods 313 of the holder base 31.

The link 33 (see FIG. 6) is affixed to the inner sliding rail 22 of the aforesaid sliding rail assembly, comprising a connection portion 331 for the coupling of the coupling portion 3221 of the swivel hook 322.

Figure 6:
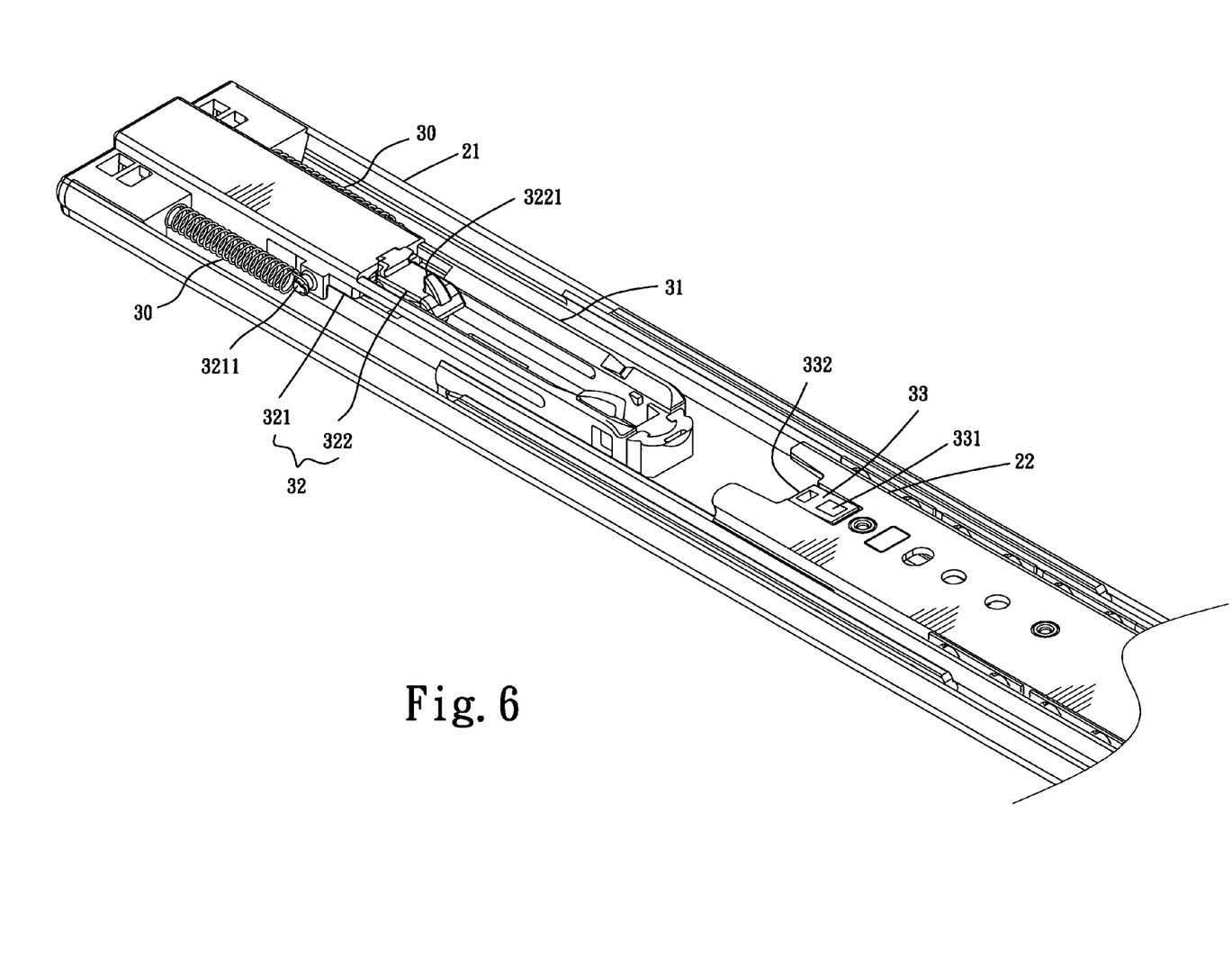
FIG. 6 illustrates the assembly of FIG. 1 installed in a sliding rail assembly for drawer according to the present invention.
Figure 7:
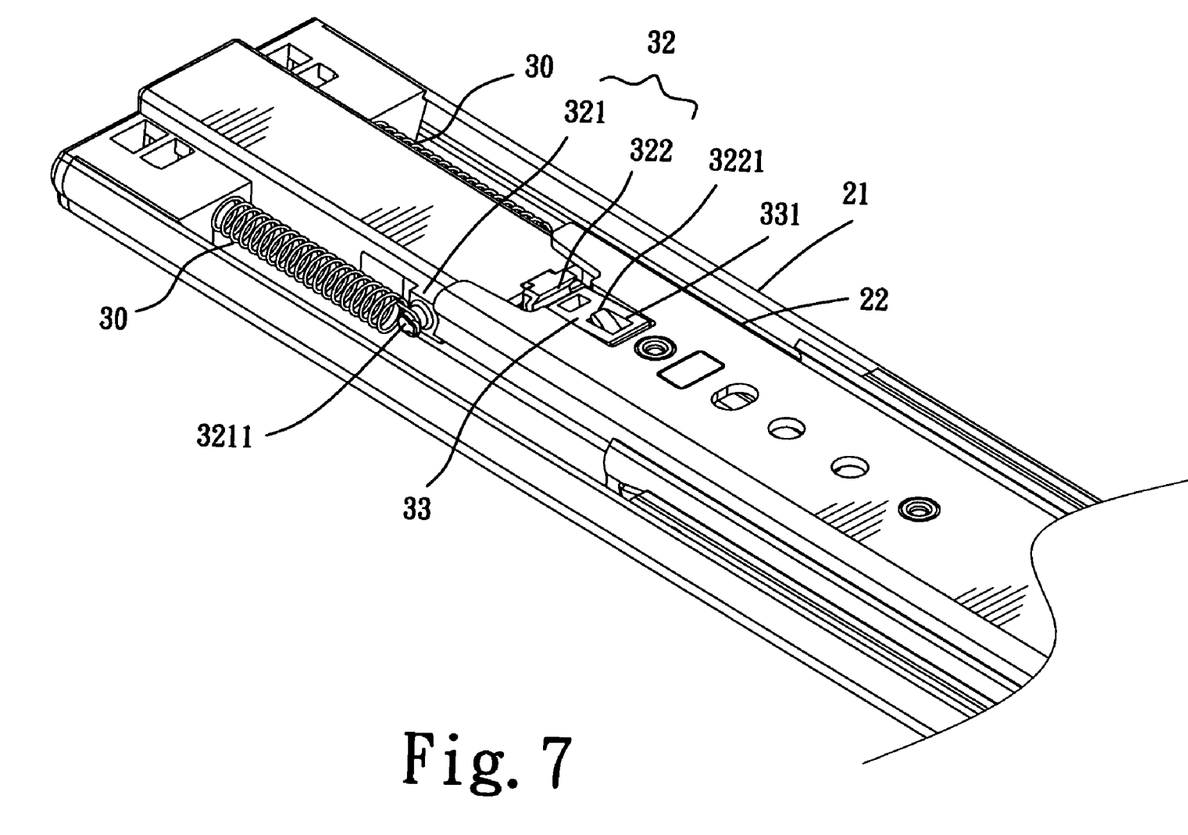
FIG. 7 corresponds to FIG. 6 showing the status of the auto-close mechanism after a return stroke of the inner sliding rail.
Figure 8:
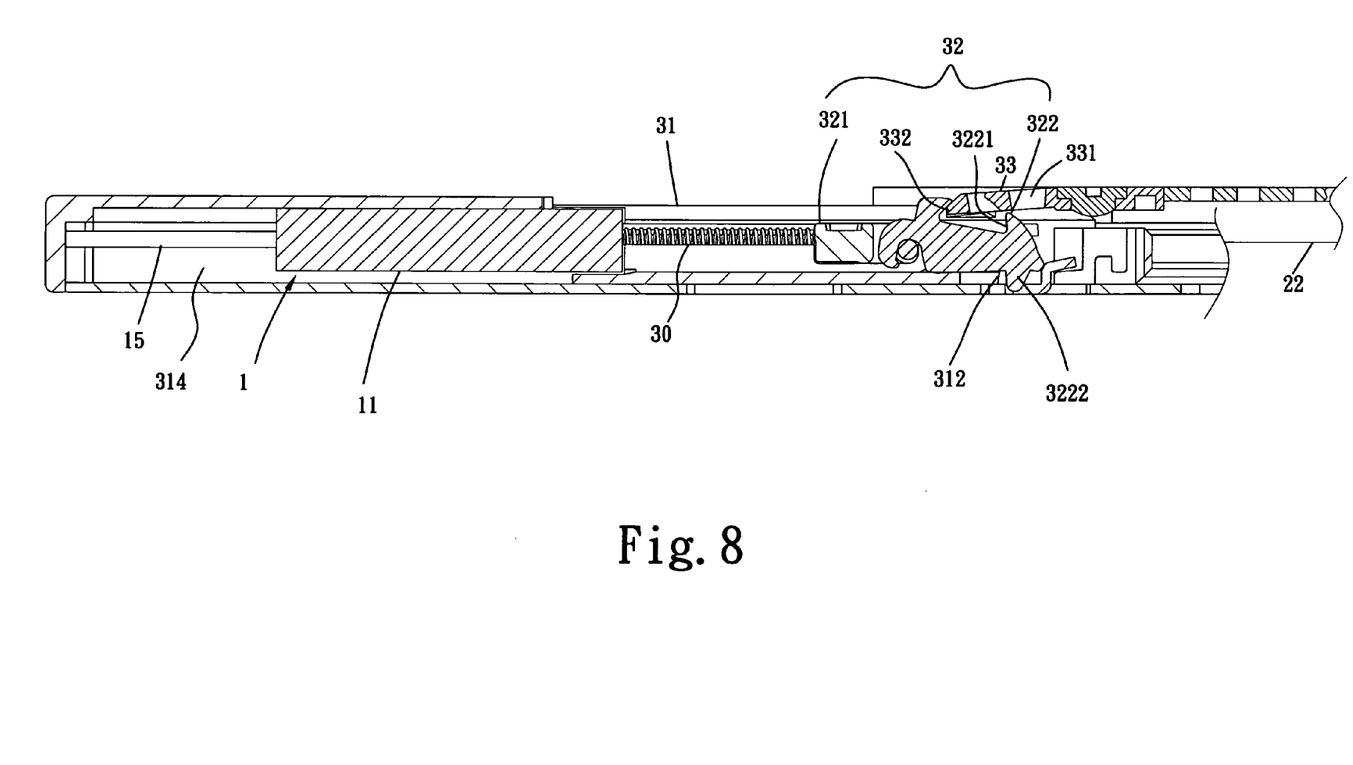
FIG. 8 is a schematic sectional view showing the retaining portion of the swivel hook secured to the locating recess of the holder base of the auto-close mechanism according to the present invention.
Figure 9:
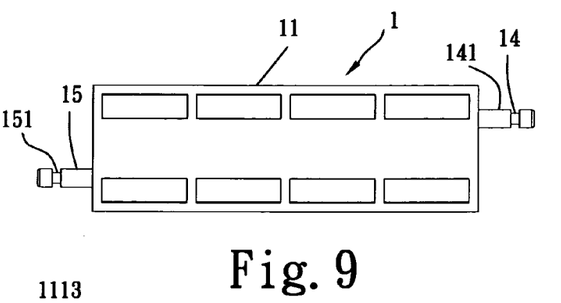
FIG. 9 is a bottom plain view of the biaxial flow damper according to the present invention, showing the received status of the piston rods.

When the inner sliding rail 22 is moved with the carrier, for example, drawer (not shown) backwards, one side 332 of the link 33 is stopped against the coupling portion 3221 of the swivel hook 322 of the sliding block set 32. This design of auto-close mechanism does not occupy much installation space while providing a long buffer stroke and better buffer effect.

Figure 10:
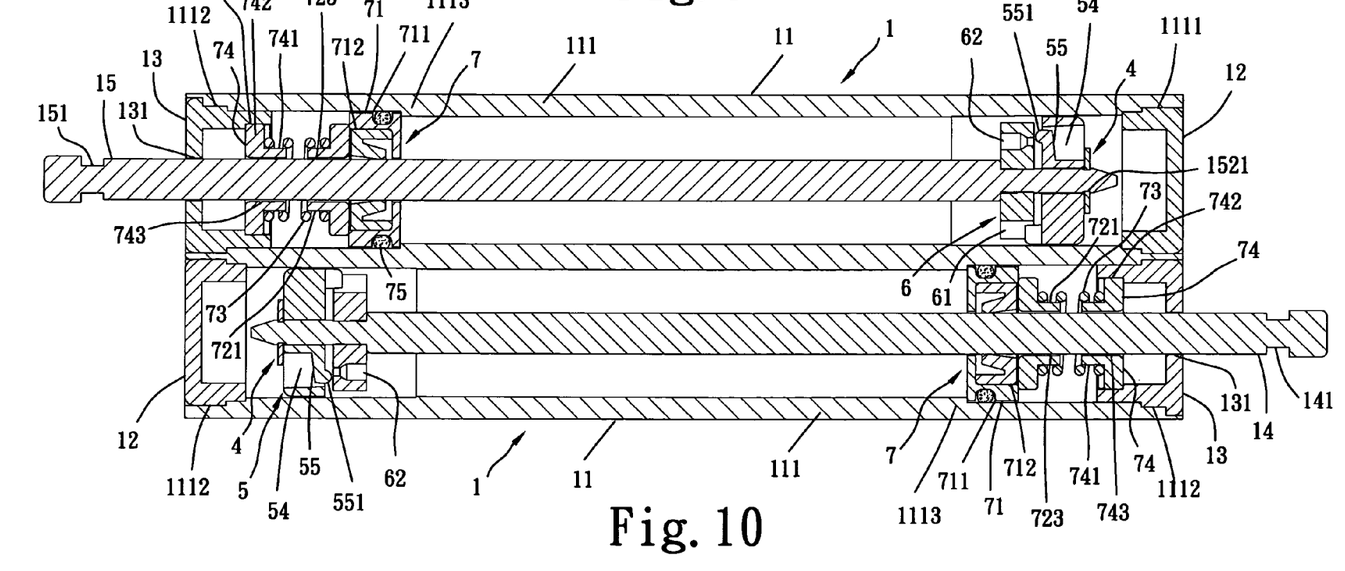
FIG. 10 is a longitudinal view in section in an enlarged scale of FIG. 9.
Figure 11:
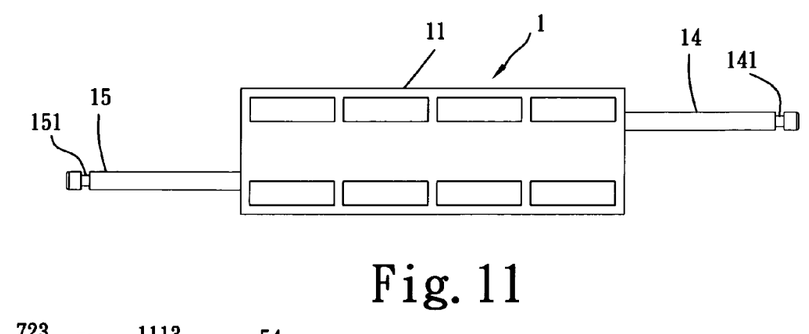
FIG. 11 is a bottom plain view of the biaxial flow damper according to the present invention, showing the extended status of the piston rods.
Figure 12:
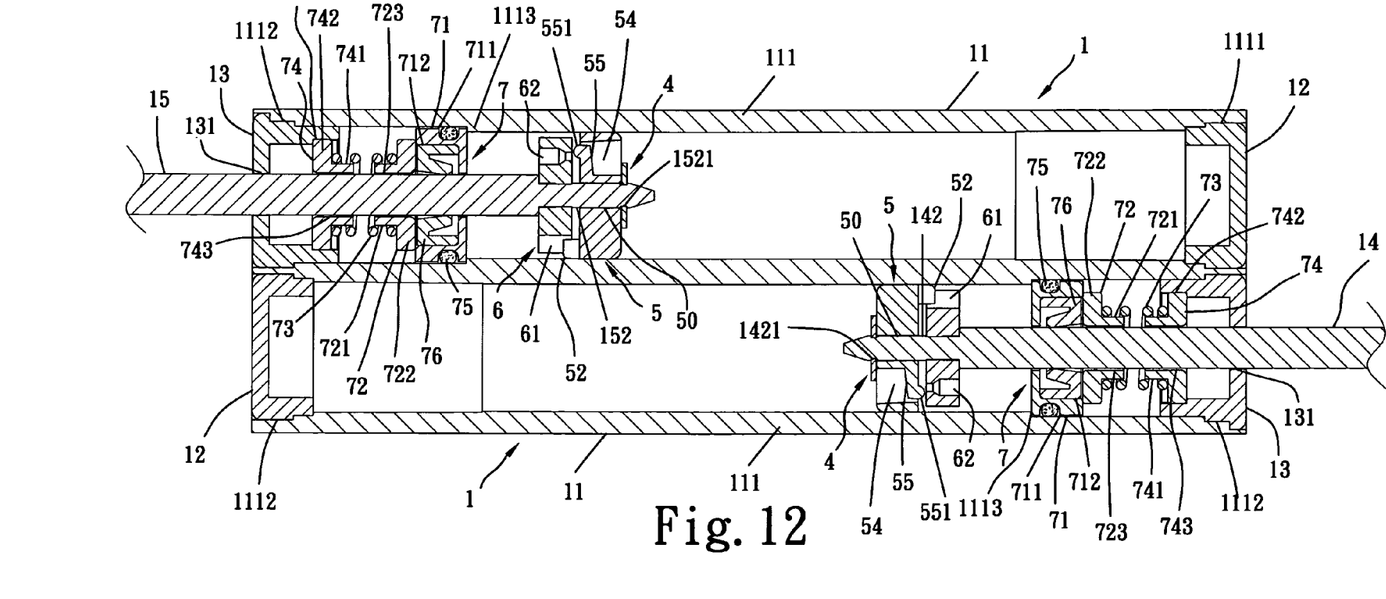
FIG. 12 is a longitudinal view in section in an enlarged scale of FIG. 11
Figure 13:
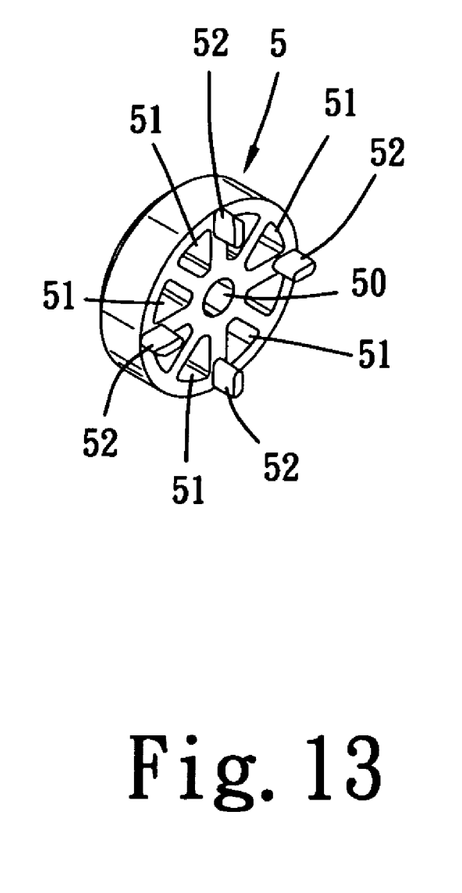
FIG. 13 is a perspective view of a part of the present invention, showing the structure of the piston of the biaxial flow damper.

Referring to FIGS. 10 and 12, the aforesaid biaxial flow damper 1 is a biaxial hydraulic cylinder comprising a cylinder body 11, two first end caps 12, two second end caps 13, a first piston rod 14, a second piston rod 15, two stop members 4, two pistons 5, and two valve blocks 6.

The cylinder body 11 comprises two hydraulic fluid chambers 111 arranged in parallel. Each hydraulic fluid chamber 111 had a first open end 1111 and a second open end 1112.

The two first end caps 12 are respectively bonded to the front and rear sides of the cylinder body 11 by, for example, an ultrasonic heat-sealing process, to block the first open end 1111 of one hydraulic fluid chamber 111 and the second open end 1112 of the other hydraulic fluid chamber 111.

The two second end caps 13 are respectively bonded to the front and rear sides of the cylinder body 11 by, for example, an ultrasonic heat-sealing process, to block the first open end 1111 of one hydraulic fluid chamber 111 and the second open end 1112 of the other hydraulic fluid chamber 111. Each second end cap 13 has an axle hole 131.

The first piston rod 14 and the second piston rod 15 are respectively inserted through the axle holes 131 of the second end caps 13, each having a reduced rear extension rod 142 or 152 respectively axially extending from the respective rear end and suspending inside the hydraulic fluid chambers 111 of the cylinder body 11 and a respective front end ending out of the front or rear side of the cylinder body 11 and provided with an annular locating groove 141 or 151. The reduced rear extension rod 142 or 152 has a mounting groove 1421 or 1521 extending around the periphery.

The stop members 4 are respectively fastened to the mounting grooves 1421 and 1521 of the reduced rear extension rods 142 and 152 of the first and second piston rods 14 and 15.

The pistons 5 are respectively slidably coupled to the reduced rear extension rods 142 and 152 of the first and second piston rods 14 and 15 in the hydraulic fluid chambers 111 of the cylinder body 11 between the valve blocks 6 and the stop members 4, each having a center axle hole 50, which receives the reduced rear extension rod 142 or 152 of the associating piston rod 14 or 15, a plurality of axial through holes 51 (see FIG. 13), a plurality of guide blocks 52 protruded from the rear side, at least one notch 54 (see FIGS. 10 and 12) respectively defining an elastic thing wall portion 55, which has an outer protrusion 551.

The valve blocks 6 are respectively slidably coupled to the reduced rear extension rods 142 and 152 of the first and second piston rods 14 and 15 in the hydraulic fluid chambers 111 of the cylinder body 11, each having an outer diameter smaller than the inner diameter of the associating hydraulic fluid chamber 111, a plurality of guide grooves 61 for receiving the guide blocks 52 of the associating piston 5 to prohibit rotation of the associating piston 5 while allowing the associating piston 5 to move axially, and a plurality of axially extending through holes 62 for aiming at some through holes 51 of the associating piston 5.

Further, the second end caps 13 may be formed integral with the cylinder body 11 during injection-molding of the cylinder body 11 from plastics.

After installation of the biaxial flow damper 1 in the holder base 31, the annular locating groove 141 of one piston rod 14 is coupled to the rear mounting groove 3212 of the slide 321, and the other piston rod 15 is inserted through a rear hole 315 of the holder base 31 for mounting.

When the first piston rod 14 and the second piston rod 15 are respectively extending out of the front and rear sides of the cylinder body 11, the pistons 5 are respectively moved by the hydraulic fluid in the respective hydraulic fluid chambers 111 toward the associating stop members 4 by means of the guides of the guide blocks 52 in the respective guide grooves 61. When the pistons 5 are respectively stopped at the stop members 4, the outer protrusions 551 of the thing wall portions 55 of the pistons 5 are stopped against the associating valve blocks 6 to keep the pistons 5 away from the associating valve blocks 6 at a distance so that the hydraulic fluid flows through the through holes 62 of the valve blocks 6 and the gap between the respective valve blocks 6 and the respective pistons 5 and the through holes 51 of the respective pistons 5, and therefore the piston rods 14 and 15 can be extended out of the cylinder body 11 rapidly. On the contrary, when the first piston rod 14 and the second piston rod 15 are respectively moving toward the inside of the cylinder body 11, the pistons 5 are respectively forced by the hydraulic fluid in the respective hydraulic fluid chambers 111 toward the associating valve blocks 6, and the outer protrusions 551 of the thing wall portions 55 of the pistons 5 are respectively forced into the notches 54 of the pistons 5, i.e., the valve blocks 6 and the pistons 5 are moved with the respective piston rods 14 and 15 against the hydraulic fluid to buffer the movement of the piston rods 14 and 15, and therefore the piston rods 14 and 15 are moved backwards to the inside of the cylinder body 11 at a slow speed. After the return stroke of the piston rods 14 and 15, the thing wall portions 55 of the pistons 5 immediately return to their former shape due to the effect of their springy material property to keep the pistons 5 away from the valve block 6 at a distance for further quick outward movement of the piston rods 14 and 15.

Further, a shock-absorbing structure 7 is provided inside the cylinder body 11 of the biaxial flow damper 1. The shock-absorbing device structure 7 comprises two shock-absorbing members 71, two inner locating blocks 72, two spring members 73, and two outer locating blocks 74, two outer seal rings 75, and two inner seal rings 76.

The shock-absorbing members 71 are respectively coupled to the piston rods 14 and 15 and axially movable within a respective sliding way 1113 in the hydraulic fluid chambers 111 of the cylinder body 11, each having an outside annular groove 711 and an inside annular groove 712. The outer seal rings 75 are respectively mounted in the outside annular grooves 711 of the shock-absorbing members 71 and disposed in close contact with the peripheries of the respective hydraulic fluid chambers 111. The inner seal rings 76 are respectively mounted in the inside annular grooves 712 of the shock-absorbing members 71 and disposed in close contact with the peripheries of the respective piston rods 14 and 15. The shock-absorbing members 71 can be made out of copper, plastics, or any of a variety of other metal materials.

The two inner locating blocks 72 are respectively mounted on the piston rods 14 and 15, each having a base 722, an center axle hole 723 cut through the front and rear sides of the base 722 for the passing of the associating piston rod 14 or 15, a circular flange 721 protruded from the front side of the base 722 around the center axle hole 723.

The two rear locating blocks 74 are respectively mounted on the piston rods 14 and 15, each having a base 742 engaged into a respective locating groove 132 of the associating second end cap 13, an center axle hole 743 cut through the front and rear sides of the base 742 for the passing of the associating piston rod 14 or 15, a circular flange 741 protruded from the front side of the base 742 around the center axle hole 743.

The two spring members 73 are respectively mounted around the piston rods 14 and 15 in the hydraulic fluid chambers 111 of the cylinder body 11 and respectively connected between the circular flanges 721 of the inner, locating blocks 72 and the circular flange 741 of the rear locating blocks 74.

When the piston rods 14 and 15 are respectively extending out of the cylinder body 11 at a high speed, the valve blocks 6 will be moved with the piston rods 14 and 15 to push the shock-absorbing members 7, causing the outer seal rings 75 to rub against the peripheries of the respective hydraulic fluid chambers 111, and at the same time the respective inner locating blocks 72 are forced against the spring members 73, achieving the desired shock-absorbing effect and lowering the noise level. Further, the outer seal rings 75 and the inner seal rings 76 seal the gap between the peripheries of the hydraulic fluid chambers 111 and the shock-absorbing members 71 and the gap between the shock-absorbing members 71 and the piston rods 14 and 15, preventing leakage.

In the aforesaid embodiment, a hydraulic fluid is filled in the hydraulic fluid chambers 111. Alternatively, air can be used to substitute for the hydraulic fluid. Further, the aforesaid first end caps and second end caps can be formed integral with the cylinder body by during injection-molding of the cylinder body to simply the fabrication and to lower the manufacturing cost. Further, spring members may be respectively mounted on the piston rods outside the cylinder body and stopped between the outside wall of the cylinder body and a respective cap nut at the outer end of the associating piston rod. Further, additional valve blocks may be coupled top the piston rods to increase resistance during movement of the piston rods.

In an alternate form of the present invention, the aforesaid first end caps 12 are eliminated, and one first open end 1111 and one second open end 1112 are respectively provided at the front and rear sides of the cylinder body 11 and respectively disposed in communication with the hydraulic fluid chamber 111 for the passing of the piston rods 14 and 15 respectively.

As stated above, the invention provides a biaxial flow damper for drawer that has the following features and advantages:

1. The cylinder body 11 has two hydraulic fluid chambers 111 and two piston rods 14 and 15 respectively slidably mounted in the hydraulic fluid chambers 111 in reversed directions to provide an enhanced buffer effect.

2. The biaxial flow damper does not require much installation space while providing a relatively longer buffer stroke.

What is claimed is:

1. A biaxial flow damper used in an auto-close mechanism of a sliding rail assembly, comprising:
    a cylinder body, said cylinder body comprising a front side, a rear side, and two flow chambers reversely arranged in parallel between said front side and said rear side;
    two first end caps respectively mounted in the front and rear sides of said cylinder body to close one end of each of said flow chambers;
    two second end caps respectively mounted in the front and rear sides of said cylinder body to close an opposite end of each of said flow chambers;
    two pistons respectively slidably mounted in said flow chambers of said cylinder body; and
    two piston rods respectively connected to said pistons and respectively extending out of said second end caps at the front and rear sides of said cylinder body.

2. The biaxial flow damper as claimed in claim 1, wherein said flow chambers of said cylinder body are respectively filled with a flow substance.

3. The biaxial flow damper as claimed in claim 2, wherein said flow substance is a hydraulic fluid.

4. The biaxial flow damper as claimed in claim 2, wherein said flow substance is a gas.

5. The biaxial flow damper as claimed in claim 1, wherein said second end caps each have an axle hole for the passing of said piston rods respectively.

6. The biaxial flow damper as claimed in claim 1, wherein said second end caps are independent members respectively bonded to the front and rear sides of said cylinder body.

7. The biaxial flow damper as claimed in claim 1, wherein said first end caps are independent members respectively bonded to the front and rear sides of said cylinder body.

8. The biaxial flow damper as claimed in claim 1, wherein said first end caps are formed integral with said cylinder body.

9. The biaxial flow damper as claimed in claim 1, wherein said pistons each have an outer diameter smaller than the diameter of the associating flow chamber of said cylinder body.

10. The biaxial flow damper as claimed in claim 1, wherein said pistons each have a plurality of axially extending through holes.

11. The biaxial flow damper as claimed in claim 1, wherein said pistons each have a plurality of guide blocks for guiding axial movement of the respective pistons in the associating flow chambers.

12. The biaxial flow damper as claimed in claim 1, further comprising two valve blocks respectively mounted on said piston rods adjacent to said pistons.

13. The biaxial flow damper as claimed in claim 12, wherein said valve blocks each have a plurality of guide grooves for guiding axial movement of said pistons, and a plurality of axial through holes.

14. The biaxial flow damper as claimed in claim 9, wherein said pistons each have at least one notch defining a respective elastic thin wall portion, said elastic thin wall portion each having a protrusion.

15. The biaxial flow damper as claimed in claim 1, further comprising two stop members respectively affixed to said piston rods inside said flow chambers for stopping said pistons at said piston rods.

16. The biaxial flow damper as claimed in claim 1, further comprising a flow substance that is a hydraulic fluid.

17. The biaxial flow damper as claimed in claim 1, wherein said two piston rods each have an outer end disposed outside said cylinder body and a mounting groove extending around the periphery of said outer end.

18. A biaxial flow damper used in an auto-close mechanism of a sliding rail assembly, comprising:
    a cylinder body, said cylinder body comprising two side by side flow chambers reversely arranged in parallel, said flow chambers each having a fixed, closed rear end and an open front end;
    two end caps respectively mounted in front and rear sides of said cylinder body to close the open ends of said flow chambers;
    two pistons respectively slidably mounted in said flow chambers of said cylinder body, said pistons each having an outer diameter smaller than the diameter of the associating flow chamber of said cylinder body; and
    two piston rods respectively connected to said pistons and respectively extending out of said end caps at the front and rear sides of said cylinder body.

19. The biaxial flow damper as claimed in claim 18, wherein said flow chambers of said cylinder body are respectively filled with a flow substance.

20. The biaxial flow damper as claimed in claim 19, wherein said flow substance is a hydraulic fluid.

21. The biaxial flow damper as claimed in claim 19, wherein said flow substance is a gas.

22. The biaxial flow damper as claimed in claim 18, wherein said end caps each have an axle hole for the passing of said piston rods respectively.

23. The biaxial flow damper as claimed in claim 18, further comprising two valve blocks respectively mounted on said piston rods adjacent to said pistons.

24. The biaxial flow damper as claimed in claim 18, wherein said two piston rods each have an outer end disposed outside said cylinder body and a mounting groove extending around the periphery of said outer end.

25. A biaxial flow damper used in an auto-close mechanism of a sliding rail assembly, comprising:

a cylinder body, said cylinder body comprising a front side, a rear side, and two flow chambers reversely arranged in parallel between said front side and said rear side;

two first end caps respectively mounted in the front and rear sides of said cylinder body to close one end of each of said flow chambers;

two second end caps respectively mounted in the front and rear sides of said cylinder body to close an opposite end of each of said flow chambers and said second end caps each having an axle hole;

two pistons respectively slidably mounted in said flow chambers of said cylinder body; and two piston rods respectively connected to said pistons and respectively extending out of said second end caps at the front and rear sides of said cylinder body.

26. The biaxial flow damper as claimed in claim 25, further comprising two valve blocks respectively mounted on said piston rods adjacent to said pistons.

27. The biaxial flow damper as claimed in claim 25, wherein said second end caps each have an axle hole for the passing of said piston rods.

28. The biaxial flow damper as claimed in claim 25, wherein said piston rods each have an outer end respectively disposed outside said cylinder body, a cap nut fastened to said outer end, and a spring member mounted on said outer end and stopped between a part of said cylinder body outside said cylinder body and said cap nut.

* * * * *